United States Patent [19]
Iwamoto

[11] Patent Number: 5,819,031
[45] Date of Patent: Oct. 6, 1998

[54] MICRO-MAINFRAME LINK CONTROL METHOD AND APPARATUS

[75] Inventor: Shinichi Iwamoto, Omiya, Japan

[73] Assignee: Canon Kabushiki Kaisha, Tokyo, Japan

[21] Appl. No.: 347,171

[22] Filed: Nov. 22, 1994

Related U.S. Application Data

[63] Continuation of Ser. No. 826,526, Jan. 27, 1992, abandoned.

[30] Foreign Application Priority Data

| Jan. 30, 1991 | [JP] | Japan | ................................... 3-009924 |
| Mar. 27, 1997 | [JP] | Japan | ................................... 3-063011 |

[51] Int. Cl.$^6$ ..................................................... G06F 13/14
[52] U.S. Cl. ................................. 395/200.6; 395/200.33; 395/683; 395/685; 364/222.2; 364/284.3
[58] Field of Search ..................................... 395/650, 700, 395/200.33, 200.6, 683, 684, 685; 379/10, 201, 207, 14, 242; 370/86; 364/222.2, 284.3

[56] References Cited

U.S. PATENT DOCUMENTS

| 4,419,728 | 12/1983 | Larson | .................................... 364/200 |
| 4,691,314 | 9/1987 | Bergins et al. | ........................... 370/94 |
| 4,712,214 | 12/1987 | Meltzer et al. | ........................... 371/32 |
| 4,748,638 | 5/1988 | Friedman et al. | .......................... 375/8 |
| 4,855,995 | 8/1989 | Hiyama et al. | ........................... 370/86 |
| 4,951,280 | 8/1990 | McCool et al. | ....................... 370/85.12 |
| 5,375,207 | 12/1994 | Blakely et al. | ..................... 395/200.33 |

FOREIGN PATENT DOCUMENTS

| 154551 | 9/1985 | European Pat. Off. . |
| 0248403 | 12/1987 | European Pat. Off. . |
| 258650 | 3/1988 | European Pat. Off. . |
| 2508200 | 12/1982 | France . |

OTHER PUBLICATIONS

"Telecommunications Protocols and Design" by John D. Spragins et al, 1991 Addison–Wesley Publishing Company, Inc. pp. 307–311.

Cay Weitzman, Distributed Micro/Minicomputer Systems, Structure, Implementation, and Application 1980, pp. 364–381.

"Channel Interface—IBM Series/1 to IBM Personal Computer," IBM Technical Disclosure Bulletin, vol. 28, No. 9, Feb. 1986.

*Primary Examiner*—Lucien U. Toplu
*Assistant Examiner*—Michael T. Richey
*Attorney, Agent, or Firm*—Fitzpatrick, Cella, Harper & Scinto

[57] ABSTRACT

A method of controlling a micro device linked to a mainframe in such a manner that a file present in the mainframe can be accessed from the micro device. In response to a request for file access from a user program, reference is made to a table in which a plurality of command sequences for use in composing transmission packets is stored, correspondingly respectively to a plurality of kinds of requests. Each of the command sequences includes a plurality of commands, which are executed to obtain respective components of a transmission packet. A transmission packet is composed in accordance with the command sequence corresponding to the kind of request from the user program, and the resulting transmission packet is transmitted to the mainframe.

13 Claims, 19 Drawing Sheets

FIG. 3

| FORMAT | MEANING AND OPERATION |
|---|---|
| `1 \| m` — MML REQUEST CODE | SET MML REQUEST CODE IN TRANSMISSION PACKET. STAGGER PACKET POINT BY MML REQUEST SIZE (1 BYTE).<br>IN EXAMPLE OF FIG. 2   100 : open<br>                                    101 : read<br>                                    102 : close |
| `2 \| ℓ1 \| r1` | SET PARAMETER OF LENGTH INDICATED BY $\ell_1$ FROM AREA POINTED OUT BY REGISTER $dr_1$ INDICATED BY $r_1$ IN TRANSMISSION PACKET. COUNT UP PARAMETER COUNTER. SHIFT PACKET POINTER BY AMOUNT $\ell_1$. |
| `3 \| ℓ2` | EXTRACT AMOUNT OF LENGTH INDICATED BY $\ell_2$ FROM RECEPTION PACKET, AND SET IN $d_0$. SHIFT PACKET POINTER BY AMOUNT $\ell_2$. |
| `4 \| r1 \| r2` | EXTRACT LENGTH OF CONTENT OF REGISTER $dr_1$ INDICATED BY $r_1$ FROM RECEPTION PACKET, AND TRANSFER TO AREA POINTED OUT BY REGISTER $dr_2$ INDICATED BY $r_2$. SHIFT PACKET POINTER BY AMOUNT $dr_1$. |
| `5` | REQUEST OS FOR TRANSMISSION OF TRANSMISSION PACKET. |
| `6` | REQUEST OS FOR RECEPTION OF RECEPTION PACKET. |
| `9` | END EXECUTION AND INTERPRETATION, AND RETURN CONTROL TO USER PROGRAM. |

FIG. 4

```
start open
set d1,32   / FILE NAME /
set d2, 2   / OPEN MODE /
send
receive
put d0 2   / file # /
end
```

```
start read
set d1, 2   / file # /
set d3, 4   / count /
send
receive
put d0 2   / DATA LENGTH /
put ret d0, d2   / DATA /
end
```

```
start close
set d1, 2   / file # /
send
receive
put d0 2   / error or code /
end
```

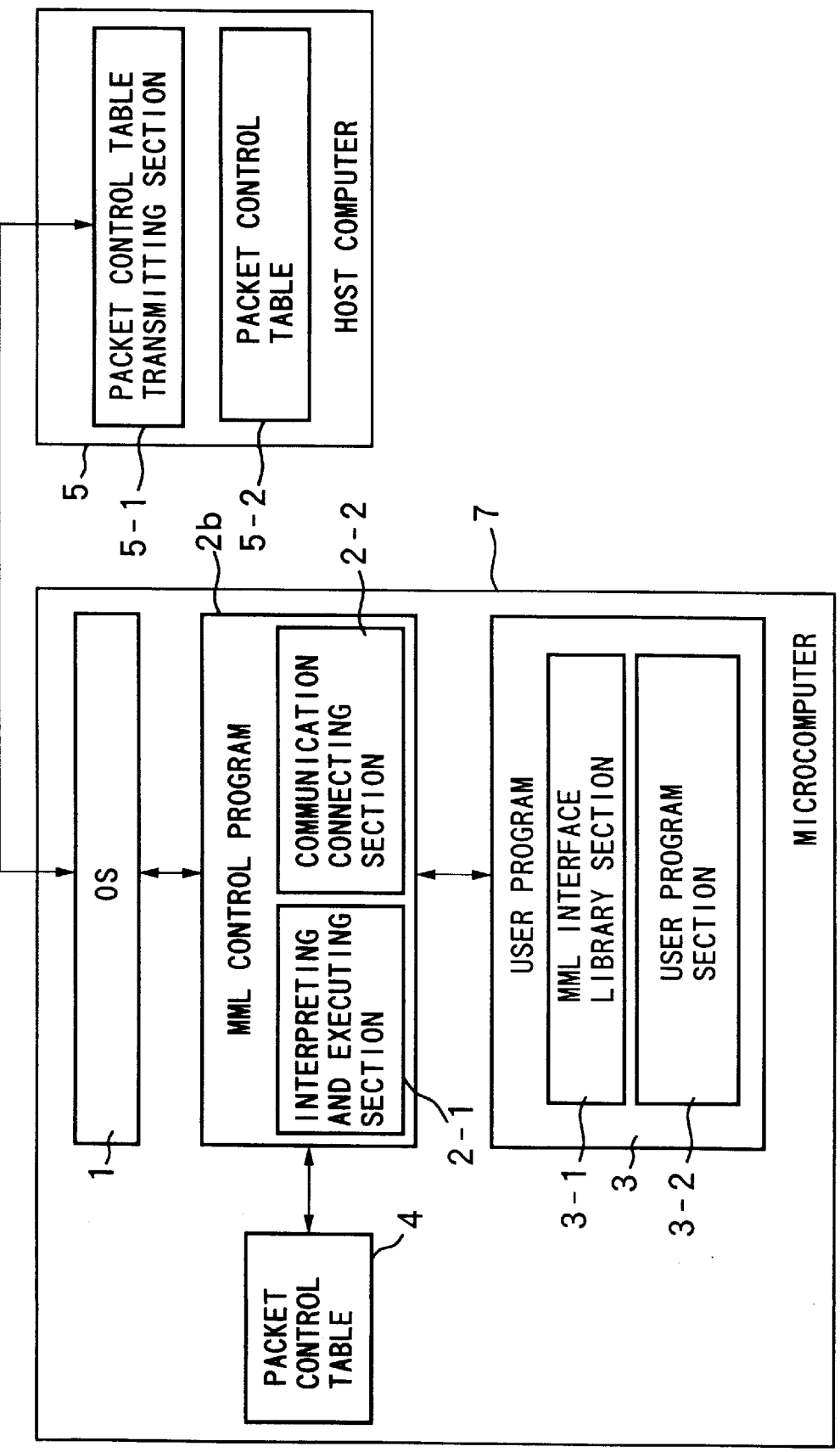

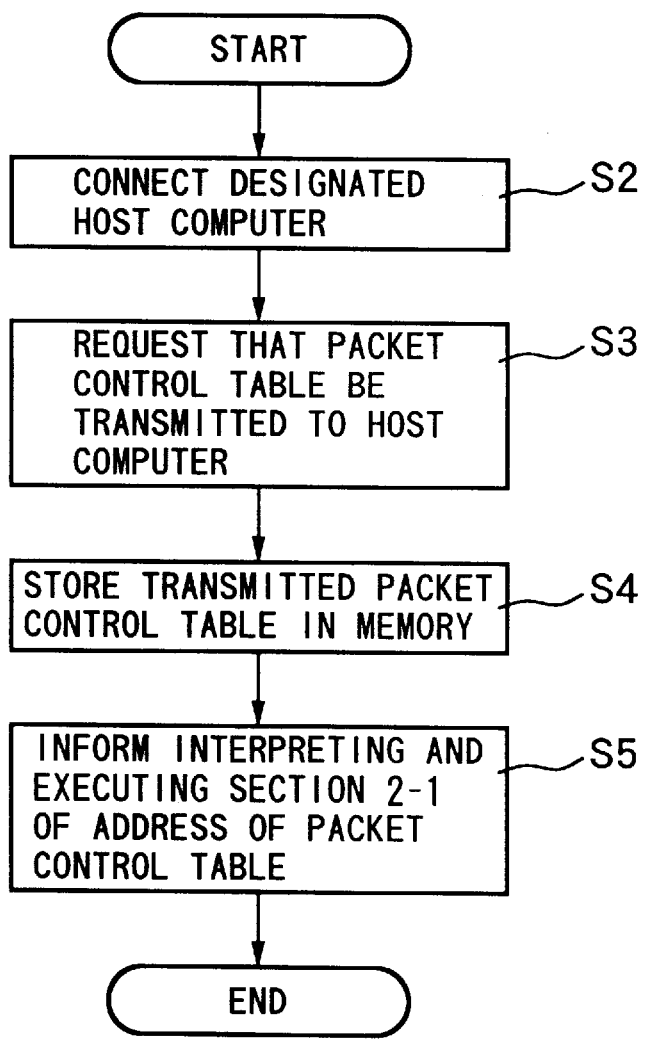

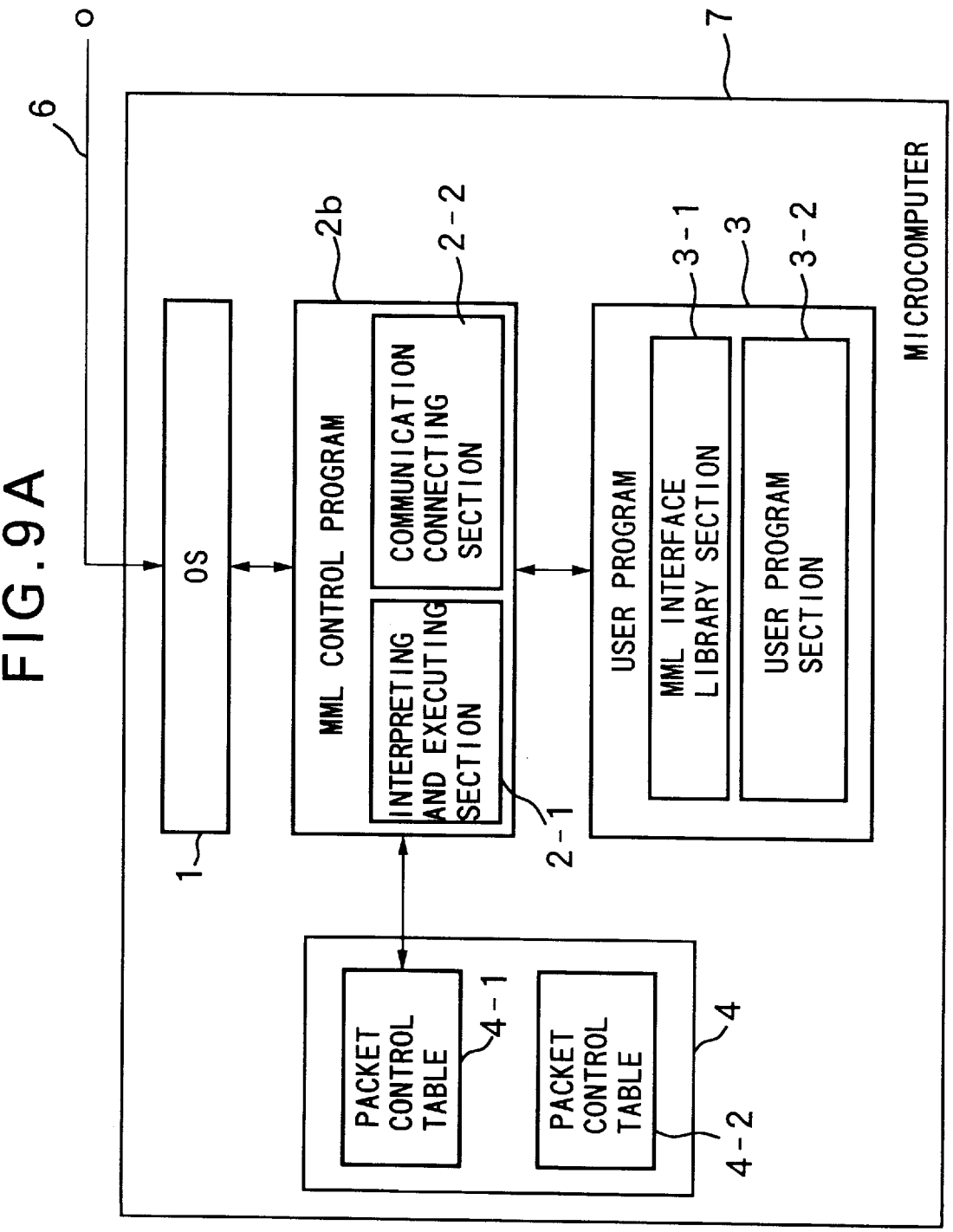

FIG. 13

```
id = open ( file name, open mode ) ;        ← P1 cnt = read ( id, buf, size ) ;              ← P2

┌─────────────────────────────┐
│ PROCESSING RELATED TO       │             ← P3
│ CONTENTS OF buf             │
└─────────────────────────────┘ err = close ( id ) ;                        ← P4
```

FIG. 14

```
                                        ┌ P1
mov d0, REQUEST CODE           ⎫
                               ⎬
mov d1, ADDRESS OF FILE NAME   ⎬ ← P11
                               ⎬
mov d2, ADDRESS OF OPEN MODE   ⎭ int MML CONTROL PROGRAM          ← P12 r.e.t                            ← P13
```

※ REQUEST CODE : VALUE "1" FOR open
　　　　　　　　　VALUE "2" FOR read
　　　　　　　　　VALUE "3" FOR close

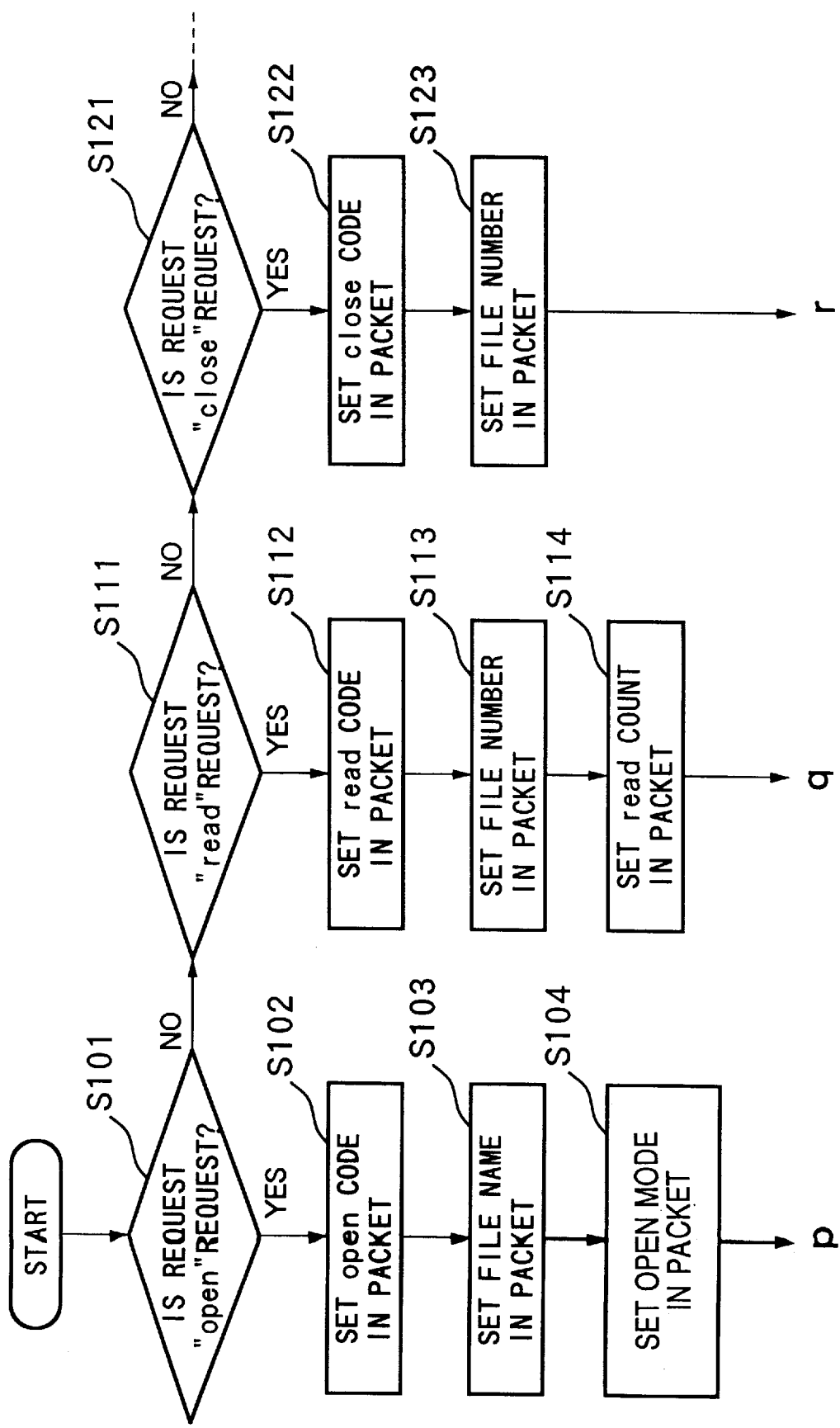

MICRO-MAINFRAME LINK CONTROL METHOD AND APPARATUS

This application is a continuation of application Ser. No. 07/826,526, filed Jan. 27, 1992, now abandoned.

BACKGROUND OF THE INVENTION

1. Field of the Invention

This invention relates to a micro-mainframe link (hereinafter referred to as an "MML") control method and apparatus wherein control is performed in such a manner that a file present in a mainframe can be accessed from a micro device such as a work station or personal computer, and the micro device and mainframe are linked.

2. Description of the Related Art

FIG. 12 shows the constitution of a program for realizing control in the conventional MML. Numeral 1 denotes an operating system (hereinafter referred to as an "OS") which includes control for performing an exchange with a communication line and a packet, and numeral 2' designates an MML control program interposed between a user program 3 and the OS 1 for creating an MML packet which performs an exchange with a mainframe (hereinafter referred to also as a host computer) in order to administer an MML function. The user program 3 comprises a user program section 3-2 which executes the logic algorithm of an application program, and an MML interface library section 3-1 for interfacing the MML control program 2' in dependence upon a call from the user program section 3-2.

FIG. 13 illustrates an example of the user program section 3-2 for reading one record of a file in the mainframe. The operation of the conventional MML control program 2' which executes the user program depicted in FIG. 13 will now be described. In FIG. 13, the arrangement is such that P1, P2 and P4 call the MML interface library section 3-1. P1 indicates the opening of a file of a specified filename by assigned openmode and the P1 program portion calls an open routine of the MML interface library 3-1 shown in FIG. 14. The open routine of FIG. 14 comprises a parameter setting portion P11, a calling portion P12 for calling the MML control program 2', and a portion P13 for effecting a return to the user program section 3-2. Accordingly, by executing P1 in FIG. 13, P11 and P12 in FIG. 14 are executed and control makes a transition to the MML control program 2'.

FIG. 15 illustrates the contents of the conventional MML control program 2'. The MML control program 2' is started by P12. In FIG. 15, it is determined at step S101 whether a request code (a value set in a register $d_0$ at P11 in FIG. 14) is an open code. If the decision rendered at step S101 is "YES" (i.e., the value is "1"), then an OPEN code is set in a packet at step S102 and the file name is set in the packet at step S103 to assemble an opening transmission packet 11 shown in the upper part of FIG. 16. At step S104 an open mode for designating either of a read mode or a writing mode in which the file is opened is set, then a request for transmission of the opening transmission packet 11 is sent to the OS 1 at step S105, and a response packet from the mainframe is awaited at step S106. An opening reception packet 21 is shown in the lower section of FIG. 16. When a response packet is received at step S106, the file number in the response packet is set in register $d_0$ at step S107. By executing step S999, control shifts to P13 of the MML interface library section 3-2, as shown in FIG. 14. As a result of executing P13, execution of P1 in the user program section 3-2 shown in FIG. 13 ends. The file number that has been stored in the register $d_0$ is set in an id area, indicated at P1, by an object program portion of P1.

The program step P1 of FIG. 13 operates as described above. Similar routine operations are carried out also with regard to P2 and P4.

By executing P2, a read routine in the MML interface library section 3-1 whose construction is similar to that of FIG. 14 is executed. The MML control program 2' of FIG. 15 is started by the read routine. In FIG. 15, the program proceeds from step S101 to step S111, where it is determined whether there is a read request. If the decision rendered is "YES", a transmission packet 12 for reading purposes shown in the upper section of FIG. 16 is created at step S112 through S114. (Specifically, a read code is set in a packet at step S112, a file number is set in the packet at step S113, and a read count is set in the packet at step S114.) A transmission request is sent to the OS1 at step S115, and a response packet from the mainframe is awaited at step S116. A reception packet 22 for reading purposes shown in the lower section of FIG. 16 is obtained by reception of the response packet, and data of a length equivalent to the read data is set at step S117 in a buffer (buf) area indicated at P2. The data length is set in register $d_0$ at step S118. At step S999, control is handed over to the read routine of the MML interface library section 3-1, control is then handed over to P2, the value of $d_0$ is set in a counter (cnt), and the program step P2 ends.

By executing P4, a close routine in the MML interface library section 3-1 whose construction is similar to that of FIG. 14 is executed. The MML control program 2' of FIG. 15 is started by this routine. In FIG. 15, the program proceeds from steps S101 and S111 to step S121, where it is determined whether there is a close request. If the decision rendered is "YES", a close transmission packet 13 shown in the upper section of FIG. 16 is created at step S122 (at which a close code is set in a packet) and step S123 (at which a file number is set in the packet). A transmission request is sent to the OS1 at step S124, and reception of a close response packet 23, shown in the lower section of FIG. 16, from the mainframe is awaited at step S125. When the packet is received, a return code is set in the register $d_0$ at step S126 At step S999, control is returned to the close routine of the MML interface library section 3-1, then control shifts to P4, the value of register $d_0$ is set in err, and the program step P4 ends.

SUMMARY OF THE INVENTION

However, the example of the prior art described above has the following drawbacks since the MML control program is created so as to perform a special operation for every request code:

(1) When there are many types of request codes, the MML control program becomes large in size. In general, the MML control program stays permanently in a microcomputer. Consequently, if the area which it occupies is large, the memory needed for the user program may be inadequate.

(2) If a new request code is added, the MML control program must be rewritten.

Accordingly, an object of the present invention is to solve the foregoing problems and provide a micro-mainframe link control method and apparatus in which the memory capacity occupied by the MML control program is reduced and it is no longer necessary to rewrite the MML control program when a new packet or request code is added.

According to the present invention, the foregoing object is attained by providing a micro-mainframe link method and apparatus characterized by provision of a packet control table in which at least the structure and transmission/reception procedure of a packet which undergoes transmission/reception between a mainframe and a micro device are stored in correspondence with requests of a link function, wherein the micro device interprets and executes the contents of the packet control table through a predetermined procedure in dependence upon a request of the link function from a user program, whereby a desired packet corresponding to the mainframe is created and transmitted to the mainframe and a desired file present in the mainframe is accessed.

In accordance with the present invention, the content of the packet control table is interpreted and executed and a packet for an MML is assembled, transmitted, received and disassembled. As a result, an MML control program can be created using a small memory capacity and the same program can be expanded.

In addition to the foregoing drawbacks of the prior art, the following problems also arise when the aforementioned packet control table stays permanently in the microcomputer together with the MML control program:

(1) In a case where an exchange of data performed by the MML with a host with which it is currently communicating ends and an exchange of data is performed by the MML with another host, the MML control program must be erased from memory and then reloaded along with the packet control table for the MML with the other host (because the protocol differs for every host).

(2) In a case where there is an exchange of arbitrary data through an MML function with a plurality of hosts, all imaginable packet control tables must be made to permanently reside in the microcomputer beforehand. As a result, the memory cannot be utilized efficiently.

Accordingly, another object of the present invention is to solve the above-mentioned problems and provide a micromainframe link control method through which files in a plurality of hosts can be accessed easily without a decline in memory utilization efficiency.

According to the present invention, the foregoing object is attained by issuing an instruction, from a micro device to a mainframe, in accordance with the designation of a user program, wherein the instruction calls for transmission of a packet control table storing the structure and transmission/reception procedure of a transmission/reception packet exchanged with the mainframe. The micro device is provided with means for downloading the packet control table and means for interpreting and executing the packet control table in response to the request of a micro-mainframe link function from the user program, the contents of the packet control table of the micro device being changed in conformity with the mainframe.

In accordance with the present invention, a function is provided for dynamically loading a packet control table for an MML in response to the request of a user program. This makes it possible to readily access the files of a plurality of hosts.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing the format, meaning and operation of the packet control information of FIG. 2;

FIG. 4 is a diagram in which the packet control information of FIG. 2 expressed by a high-level language;

FIG. 6 is a diagram showing an example of an MML control method according to a second embodiment of the present invention;

FIG. 7 is a diagram showing the processing procedure of a communication connecting portion in the MML control program of FIG. 6;

FIG. 9A and 9B are a diagram showing an example of an MML control method according to a third embodiment of the present invention;

FIG. 13 is a diagram showing an example of a user program section;

FIG. 14 is a diagram showing an example of an open routine in an MML interface library;

FIG. 15A and 15B are a diagram showing the processing procedure of the conventional MML control program.

DESCRIPTION OF THE PREFERRED EMBODIMENTS

<First Embodiment>

Figure 1:
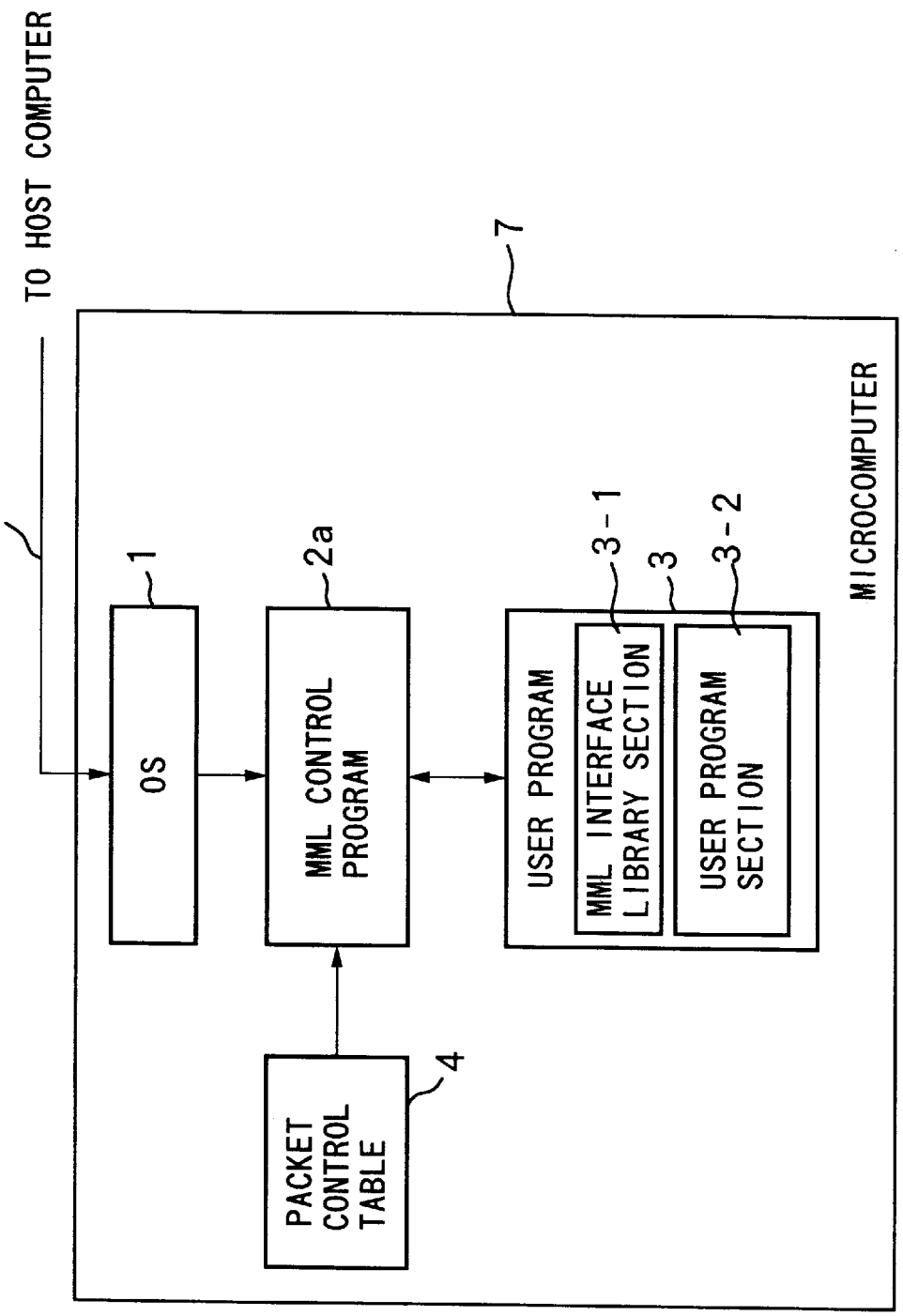
FIG. 1 is a diagram showing an example of an MML control method according to a first embodiment of the present invention.

FIG. 1 illustrates an example of the constitution of a program for realizing an MML control method according to the first embodiment of the present invention. Numeral 1 denotes an operating system (OS) for performing an exchange with a communication line and a packet 2*a* denotes an MML control program for administering an MML function 3 denotes a user program serving as an application program using the MML function 4 denotes a packet control table for controlling the assembly of an MML packet, controlling the transmission thereof by the MML control program 2*a*, controlling the reception of the MML packet from the mainframe, and controlling the delivery of the data in the packet to the user program. Though the OS 1, MML control program 2*a*, user program 3 and packet control table 4 can be constituted by a RAM, the MML control program 2*a* in this embodiment can be realized by a ROM as well.

Figure 2:
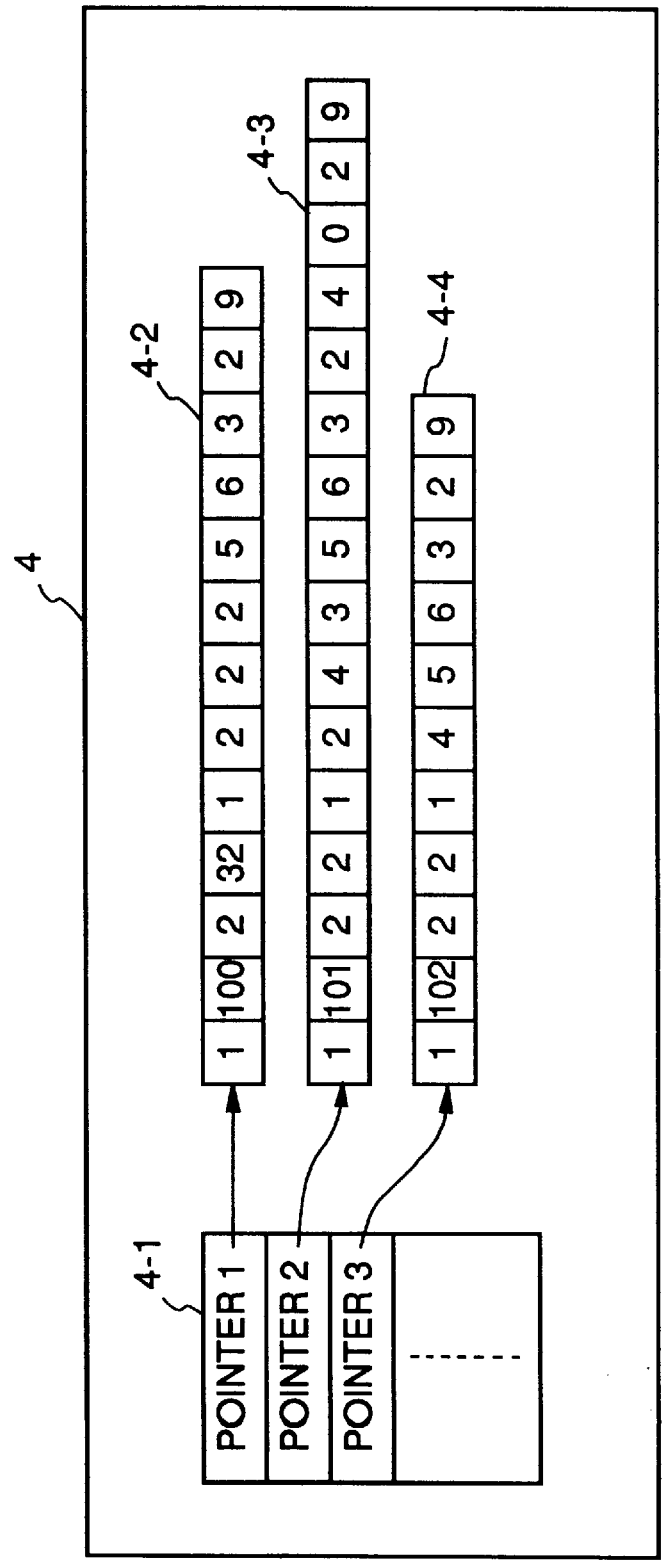
FIG. 2 is a diagram showing an example of the constitution of a packet control table according to this embodiment.

FIG. 2 shows the construction of the packet control table 4. The table 4 includes a packet control index 4-1, which is an array of pointers. Each pointer points to a request code. In this example, a pointer 1 to packet control information 4-2 for opening purposes is stored in a first (corresponding to request code "1") of the indices, a pointer 2 to packet control information 4-3 for reading purposes is stored in a second (corresponding to request code "2") of the indices, and a pointer 3 to packet control information 4-4 for closing purposes is stored in a third (corresponding to request code "3") of the indices. The items of packet control information 4-2 through 4-4 are character strings for every byte corresponding to each request code and are interpreted and executed from left to right according to the format and values shown in FIG. 3. The MML control program 2*a* performs the function of an interpreter for carrying out this interpretation and execution. The character strings of the packet control information 4-2 through 4-4 in FIG. 2 are the result of interpreting each of the programs in FIG. 4, expressed in packet control language, in accordance with the format and values shown in FIG. 3.

The operating procedure of the MML control program 2*a* will now be described with reference to FIG. 5. In FIG. 13, which is one example of the user program section 3-2, the MML interface library 3-1 is called by each of the processes P1, P2 and P4. The process P1 indicates that a file of a specified filename is opened by assigned openmode. The program portion of process P1 calls the open routine of the MML interface library 3-1 shown in FIG. 14.

The open routing of FIG. 14 comprises a parameter setting portion P11, a call portion P12 for calling the MML control program, and a portion P13 for returning to the user program section 3-2. Accordingly, by executing process P1 in FIG. 13, P11 and P12 in FIG. 14 are executed and control shifts to the MML control program 2*a*. Here the operation of the MML control program 2*a* after the values of parameters have been prepared by P11 of FIG. 14 and the MML control program 2*a* has been started by P12 will be described with reference to the processing procedure of the MML control program 2 shown in FIG. 5 and the example of code interpretation shown in FIG. 3.

Figure 5A:
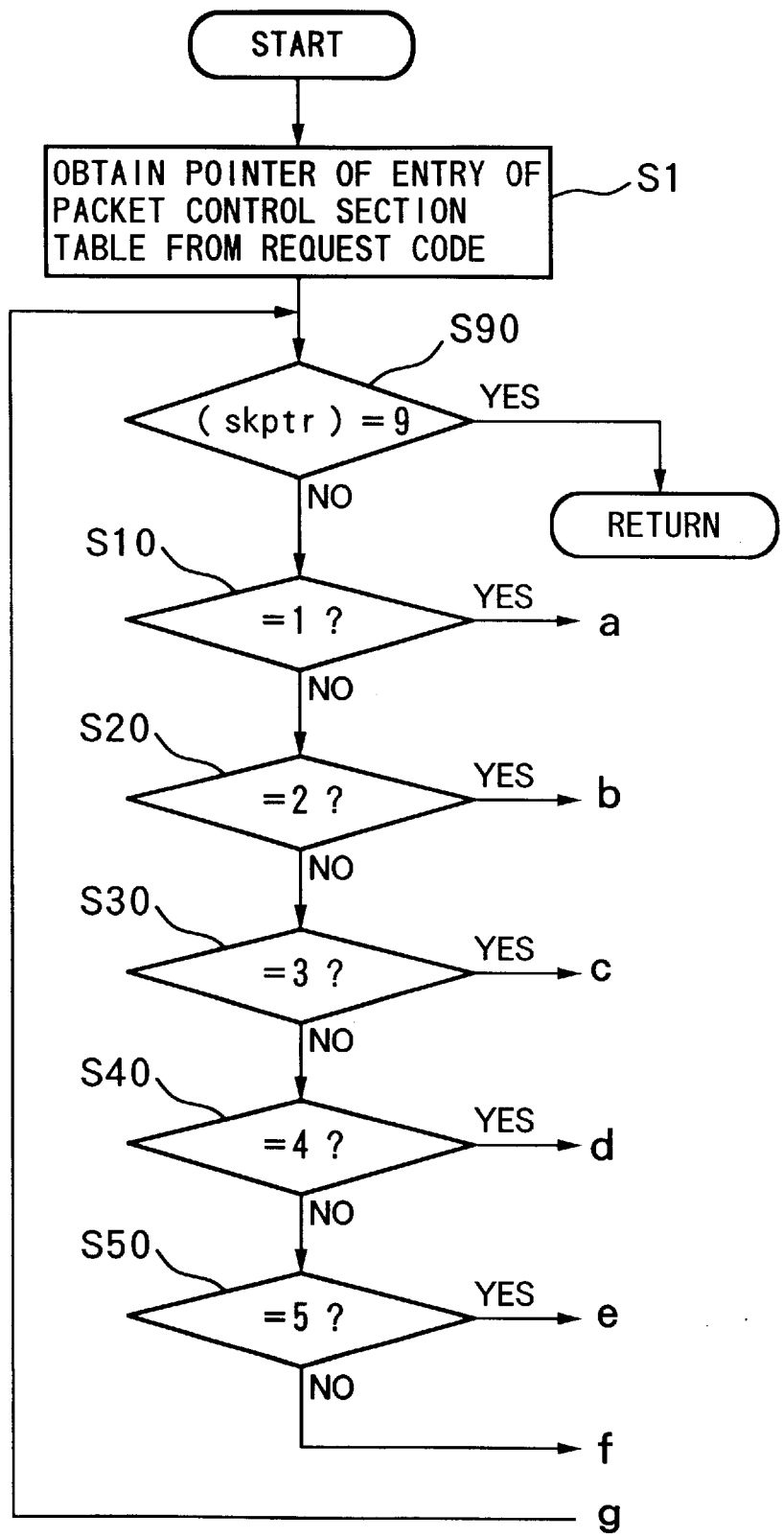
FIG. 5A and 5B are a diagram showing the processing procedure of an MML control program according to this embodiment.
Figure 5B:
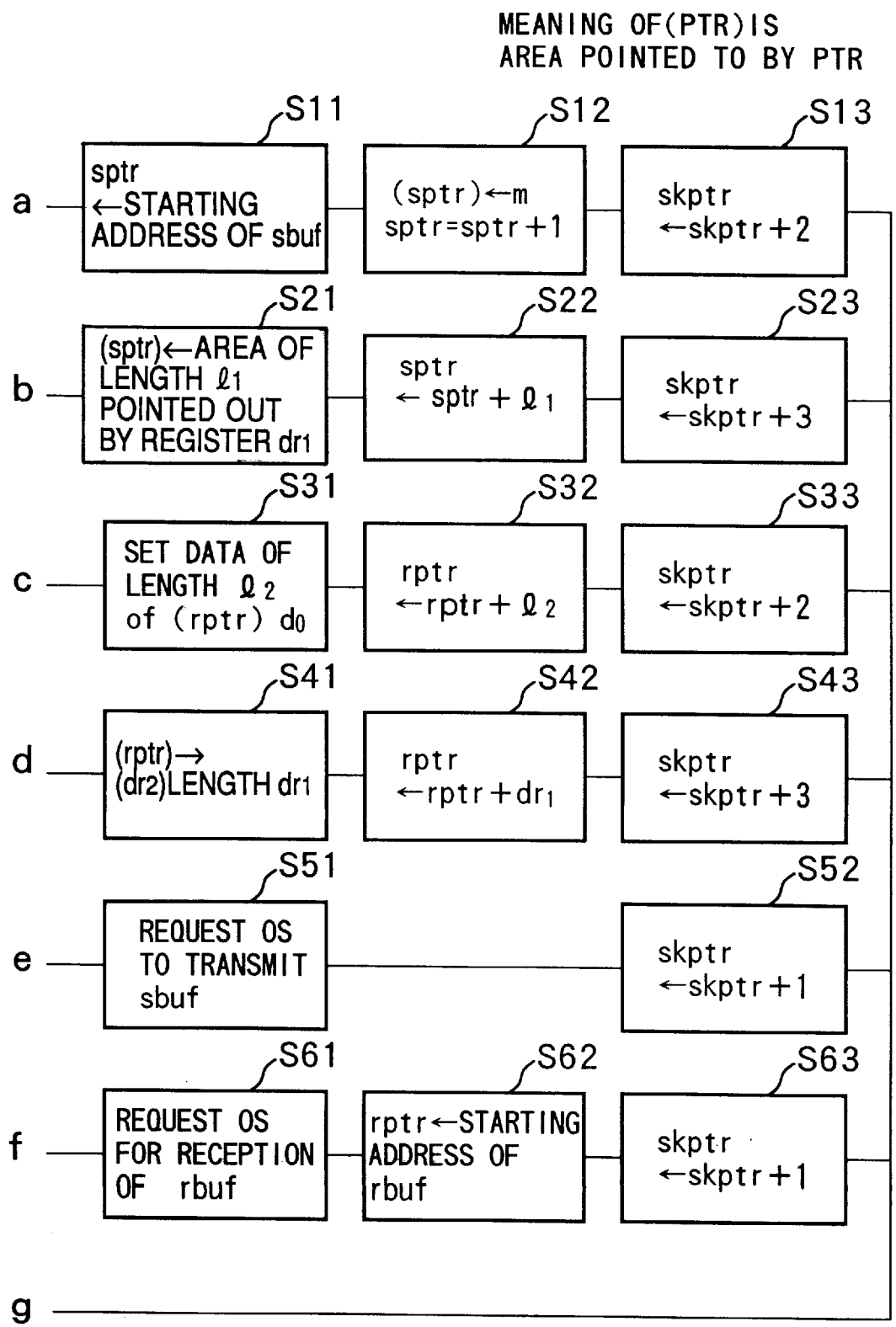

At step S1 in FIG. 5, the MML control program 2*a* accepts a request code, which has been set by P11 in FIG. 14, from $d_0$, and the value of the request code is recognized as being "1" (open). With regard to the array of the packet control indices 4-1, the pointer to the packet control information 4-2 for opening purposes is obtained with the request code "1" serving as the index, and this is set as a packet control information pointer (skptr). Next, at step S90, the area of the byte pointed to by the packet control information pointer (skptr) is observed. Since this value is "1", the program proceeds to step S11 owing to the decision rendered at step S10.

At step S11, a transmission packet pointer (sptr) is set at the head of a transmission packet buffer (sbuf). Then, at step S12, "m" (100 in this example) shown in FIG. 3 is stored in the transmission packet buffer and the transmission packet pointer (sptr) is updated to the location at which data is to be stored next. At step S13, 2 is added to the packet control information pointer (skptr). As a result, the packet control information pointer (skptr) points out the packet control information that is to operate next. Here the packet control information pointer (skptr) points to the third item of information "2" of the packet control information 4-2 for opening purposes.

Next, control shifts again to step S90. Since the leading byte pointed to by the packet control information pointer (skptr) is now "2", the program proceeds to step S21 through steps S10, S20. At step S21, data having the length $l_1$ shown in FIG. 3, namely data having a length of 32 bytes in this example, is posted from the area at address $d_1$ to the area pointed out by the transmission packet pointer (sptr). Next, at step S22, 32 is added to the transmission packet pointer (sptr), and the parameter count is incremented. Then, at step S23, 3 is added to the packet control information pointer (skptr) to prepare for the next operation. In other words, the packet control information pointer (skptr) points to the sixth item of information "2" in the packet control information 4-2 for opening purposes. Thereafter, and in similar fashion, two bytes of the open mode are stored in the packet. At completion, the packet control information pointer (skptr) will point to the ninth item of information "5".

Next, since the one byte pointed to by the packet control information pointer (skptr) has a value of "5", the program proceeds to step S51 through steps S90, S10, S20, S30, S40 and S50. Here the open transmission packet 11 in the upper section of FIG. 16 will have been created in the transmission packet buffer (sbuf). At step S51, a transmission request is issued to the OS 1 in order to transmit the transmission packet buffer (sbuf) to the mainframe. At the end of transmission, 1 is added to the packet control information pointer (skptr) at step S52 to prepare for the next operation request. Here the packet control information pointer (skptr) points to the tenth item "6" in the packet control information 4-2 for opening purposes.

Next, since the one byte pointed to by the packet control information pointer (skptr) has a value of "6", steps S90, S10, S20, S30, S40 and S50 are executed and "NO" decision is rendered at step S50. As a result, the program proceeds to step S61. At this step, a response is awaited from the mainframe and a request is issued to the OS to request that the response packet be copied to a reception packet buffer (rbut). When reception is completed, the content of the reception packet buffer (rbut) becomes the reception packet 21 for opening purposes in the lower section of FIG. 16. At step S62, the reception packet pointer (rptr) is set at the head of the reception packet buffer (rbut). Next, 1 is added to the packet control information pointer (skptr) at step S63 to prepare for the next operation request. Here the packet control information pointer (skptr) points to the 11th item "3" in the packet control information 4-2 for opening purposes.

Next, since the one byte pointed to by the packet control information pointer (skptr) has a value of "3", the program proceeds to step S31 through steps S90, S10, S20 and S30. At step S31, data having the length $l_2$ shown in FIG. 3, namely data having a length of 2 bytes in this example, is set to $d_0$ from the area pointed out by sptr. Next, at step S32, a value of 2 is added to sptr to update the reception packet pointer (rptr) to the point at which reading is to be performed next. At step S33, 2 is added to the packet control information pointer (skptr) to prepared for the next operation. Here the packet control information pointer (skptr) points to the 13th item "9" in the packet control information 4-2 for opening purposes.

Next, since the one byte pointed to by the packet control information pointer (skptr) has a value of "9", a "YES" decision is rendered at step S90. As a result, execution of the MML control program 2*a* is terminated, control shifts to the MML interface library section 3-1, a return is eventually effected to the user program section 3-2, and execution of the process P1 in FIG. 13 ends.

Figure 16:
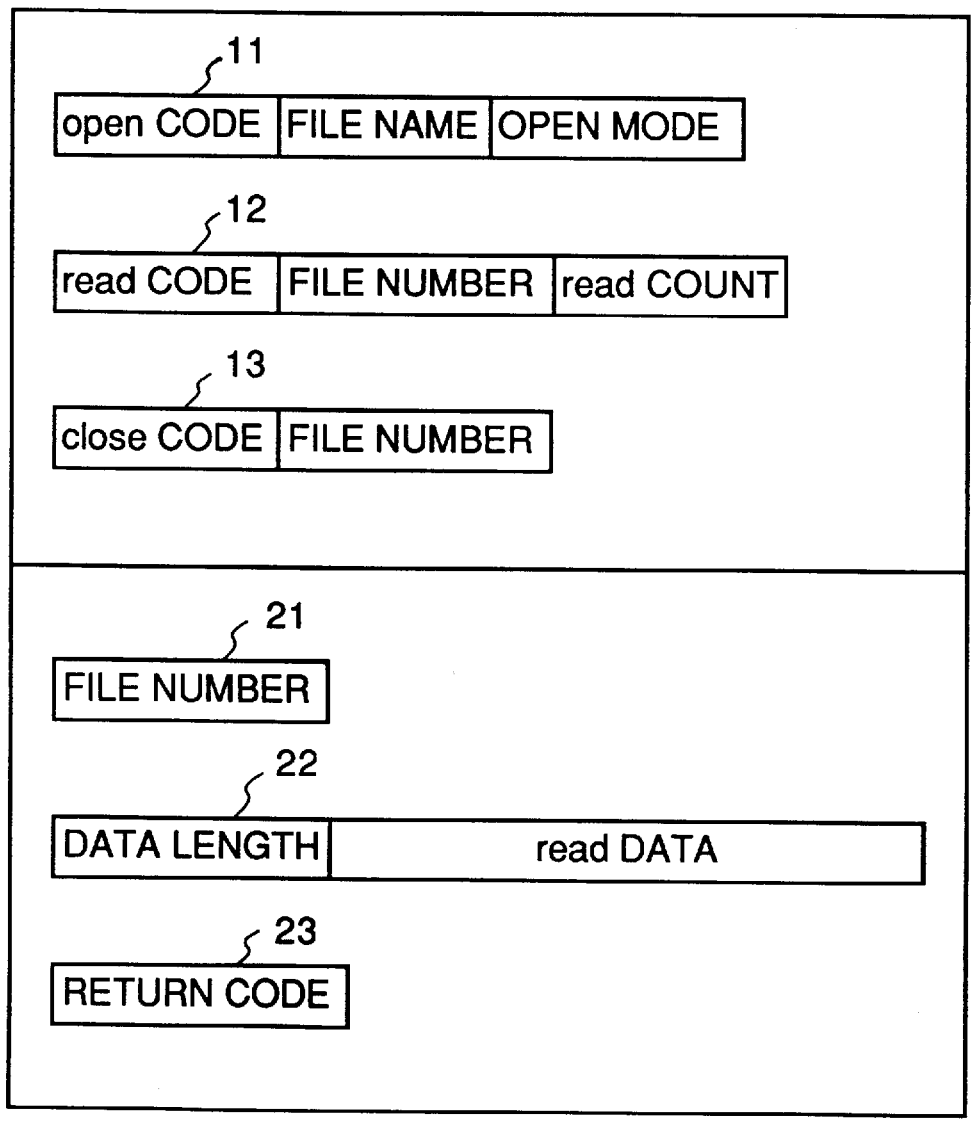
FIG. 16 is a diagram showing an example of an MML packet transmitted and received by an MML control program.

With regard also to the processes P2 and P4 of FIG. 13, the MML control program 2*a* interprets and executes the packet control information 4-3 for reading or the packet control information 4-4 for closing, respectively, in a manner similar to that described above, the transmission packet 12 for reading or the transmission packet 13 for closing, respectively, shown in the upper section of FIG. 16, is transmitted to the mainframe, the reception packet 22 for reading or the reception packet 23 for closing, respectively, shown in the lower section of FIG. 16, is received from the mainframe, and the necessary data is returned to the user program.

Once the MML control program 2a for interpreting and executing the packet control information shown in FIG. 5 has been created using the above-described method, means are obtained for creating a packet corresponding to a request code newly added merely by updating the packet control table 4. Since logic need not be added, as is required in the prior art, only a small area of memory is occupied. In addition, the MML control program 2a, which is a program that stays permanently in memory, can be realized by a ROM. As a result, a small RAM area in a microcomputer can be utilized in an effective manner.

Thus, the embodiment described above has the following advantages:

(1) The amount of memory occupied by the MML control program can be reduced.
(2) It is unnecessary to rewrite the control program even when a new MML packet and a request code (the routine name, such as "open", "seek", which calls the function in the mainframe) are added.
(3) The MML control program can be put into the form of ROM so that the RAM area used by the user program can be increased.

<Second Embodiment>

FIG. 6 illustrates an example of the constitution of a program for realizing an MML control method according to the second embodiment of the present invention. The difference between the arrangement shown in FIG. 6 and that of the first embodiment of FIG. 1 is an MML control program 2b. The MML control program 2a in FIG. 1 functionally corresponds to an interpreting and executing section 2-1 in FIG. 6. A communication connecting section 2-2 in FIG. 6 is a function added on in this embodiment.

In FIG. 6, numeral 1 denotes the operating system (OS) for performing an exchange with a communication line and a packet, 2b the MML control program for administering an MML function, 2-1 an interpreting and executing section for interpreting and executing a packet control table 4, and 2-2 the communication connecting section which, in accordance with a host connection request from the user, requests that the packet control table 4 be transmitted to the host and downloads the packet control table 4 from the host. Numeral 3 denotes the user program serving as an application program using the MML function. The packet control table 4, which is downloaded from the host by the communication connecting section 2-2, is for controlling the assembly of an MML packet and the transmission thereof by the MML control program 2b, the reception of the MML packet from the mainframe, and the delivery of the data in the packet to the user program.

Numeral 5 denotes a host computer (mainframe) which performs an exchange with a packet through a communication line 6. The host computer 5 includes a packet control table transmitting section 5-1 for transmitting a packet control table 5-2 in the host computer 5 in response to a download request of the communication connecting section 2-2. The packet control table 5-2 is transmitted to the microcomputer 7 from the packet control table transmitting section 5-1. The result of downloading performed by the communication connecting section 2-2 is the packet control table 4. The microcomputer 7 has with the OS 1, the MML control program 2, the user program 3 and the packet control table 4 provided in a RAM, by way of example. The interpreting and executing section 2-1 may be a ROM.

Next, the operation of the MML control program 2b having the foregoing arrangement will be described. The user program section 3-2 in the user program 3 issues a request for connection to the host computer 5. The connection request is made by calling the connection routine of the MML interface library section 3-1 accompanied by the name of the host. The connection routine of the MML interface library section 3-1 calls the communication connecting section 2-2 using an expedient such as an interrupt.

FIG. 7 is the program of the communication connecting section 2-2. At step S2 in FIG. 7, the connection communicating section 2-2 of the MML control program 2 acquires the name of the host from the MML interface library section 3-1 and is connected to the host designated by the host name. This is followed by step S3, at which a designation is issued to the packet control table 5-2 in the host computer 5 and a request is made to transmit the packet control table 5-2 in the host computer 5. In response to this request, the packet control table transmitting portion 5-1 transmits the packet control table 5-2 through the communication line 6. Next, at step S4, the connection communicating section 2-2 receives the packet control table 5-2 sent through the communication line 6 and stores it in memory as the packet control table 4. Then, at step S5, the connection communicating section 2-2 communicates the address of the packet control table 4 in memory to the interpreting and executing section 2-1.

Once connection to the host computer 5 has been made and the packet control table 4 has been stored in this manner, the interpreting and executing section 2-1 implements the MML function by performing an operation the same as that in the first embodiment. That is, the interpreting and executing section 2-1 corresponds to the MML control program 2a in FIG. 1, and the address of the packet control table 4 in FIG. 6 is not fixedly decided (the address becomes a fixed address when the MML control program 2 has been loaded in the microcomputer 7), as in the manner of the address of the packet control table 4 in FIG. 1. Rather, the connection communicating section 2-2 in FIG. 6 performs downloading, and the address is that which prevails when the program is stored in the memory of the microcomputer 7. Thus, the address is not fixed. This is different from the foregoing arrangement.

Figure 8A:
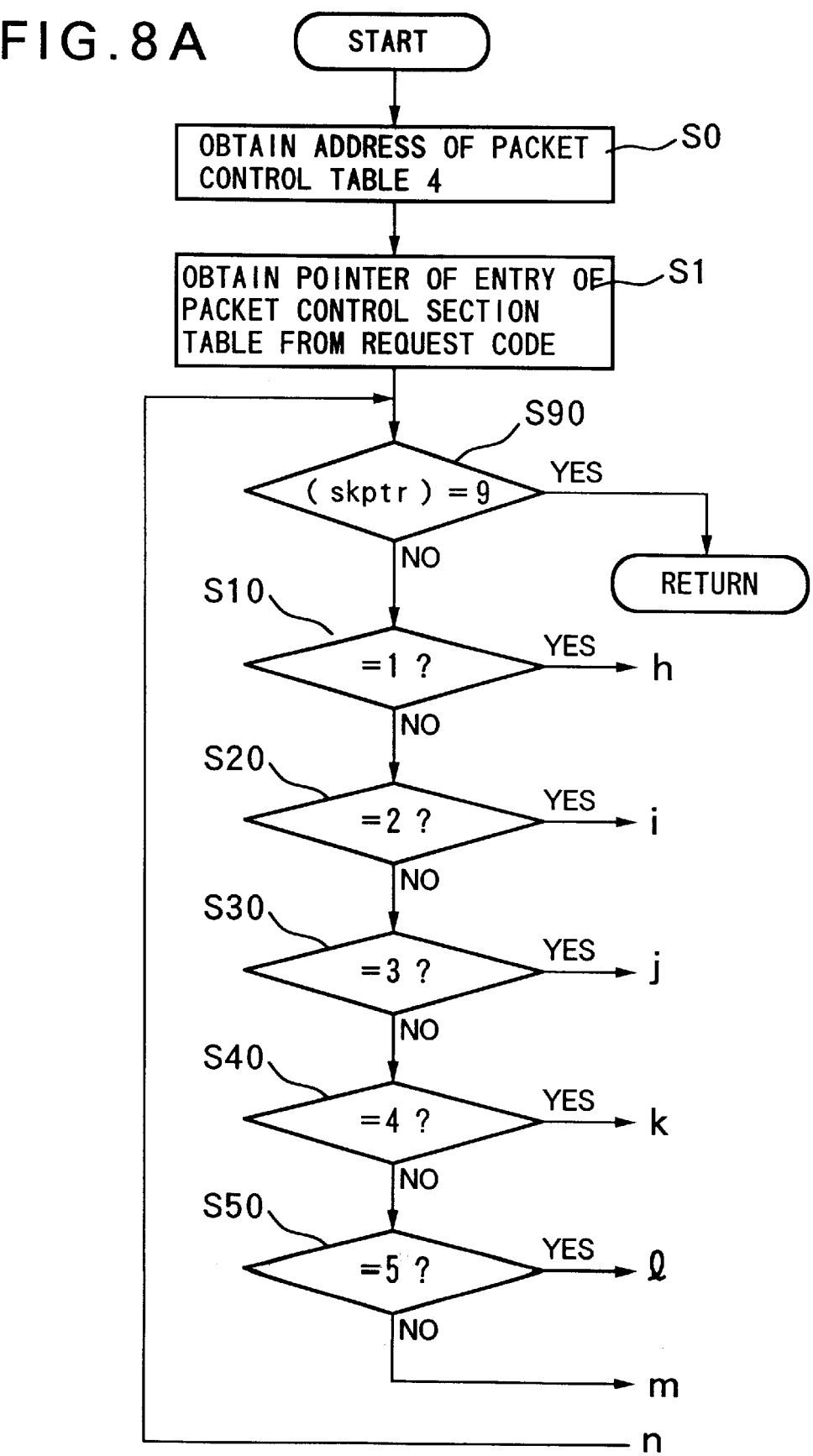
FIG. 8A and 8B are a diagram showing the processing procedure of an interpretation executing portion in the MML control program of FIG. 6.
Figure 8B:
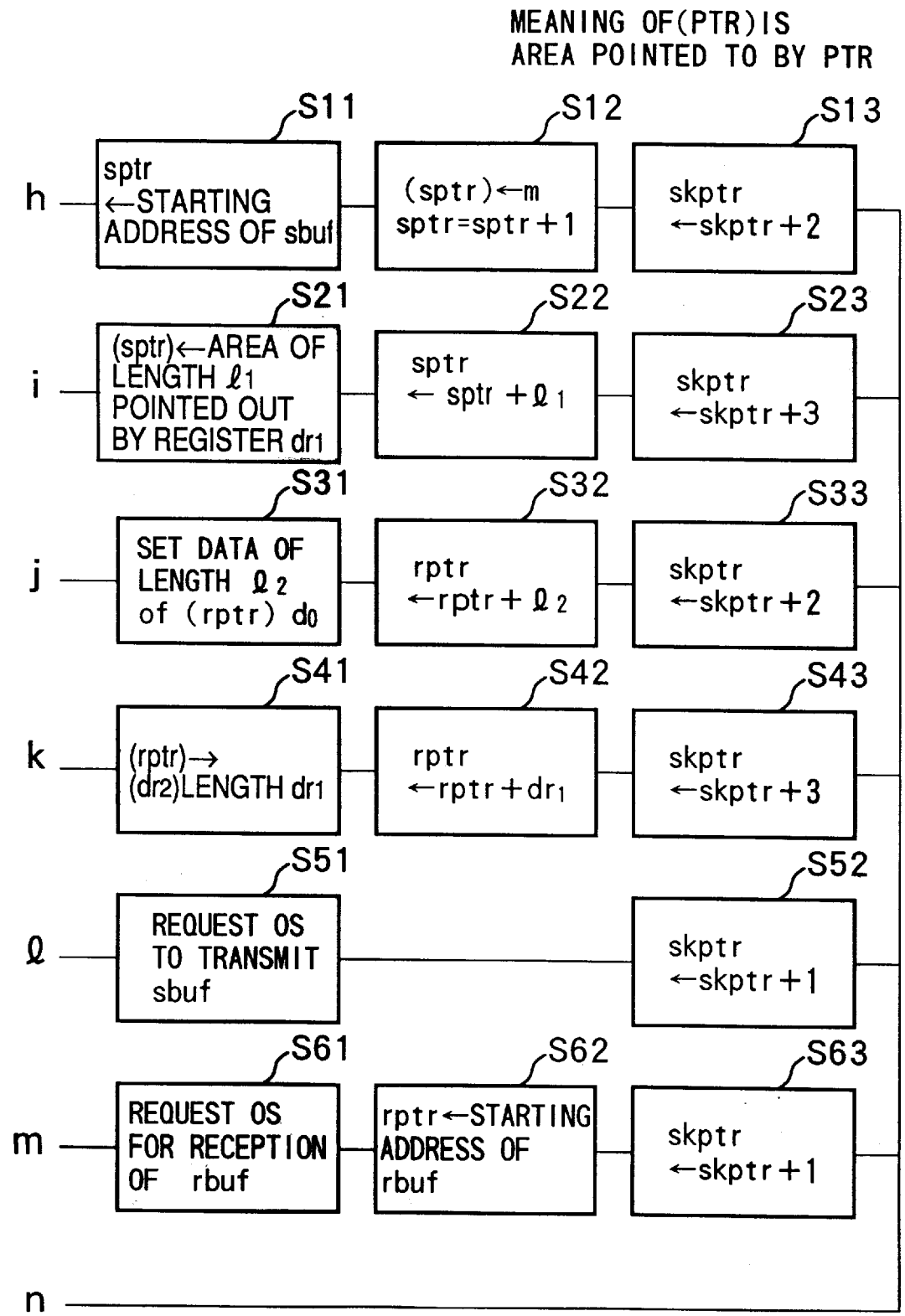

The program of the interpreting and executing section 2-1 is as shown in FIG. 8. This program is obtained merely by adding step S0 to the program of FIG. 5 representing the first embodiment. In the interpreting and executing section 2-1, after obtaining the address of the packet control table 4 obtained from the connection communicating section 2-2 at step S0, it will suffice to apply the explanation based upon FIGS. 2 through 4, 13, 14 and 15 of the first embodiment to the program of FIG. 8. A detailed description not be repeated.

By adopting the method described above, communication by an MML function can be accomplished with any host computer designated by a user program, means for reloading the MML control program together with packet control table as in the first embodiment may be dispensed with, and it is possible for the user program to designate any host in terms of the program.

<Third Embodiment>

Figure 9B:
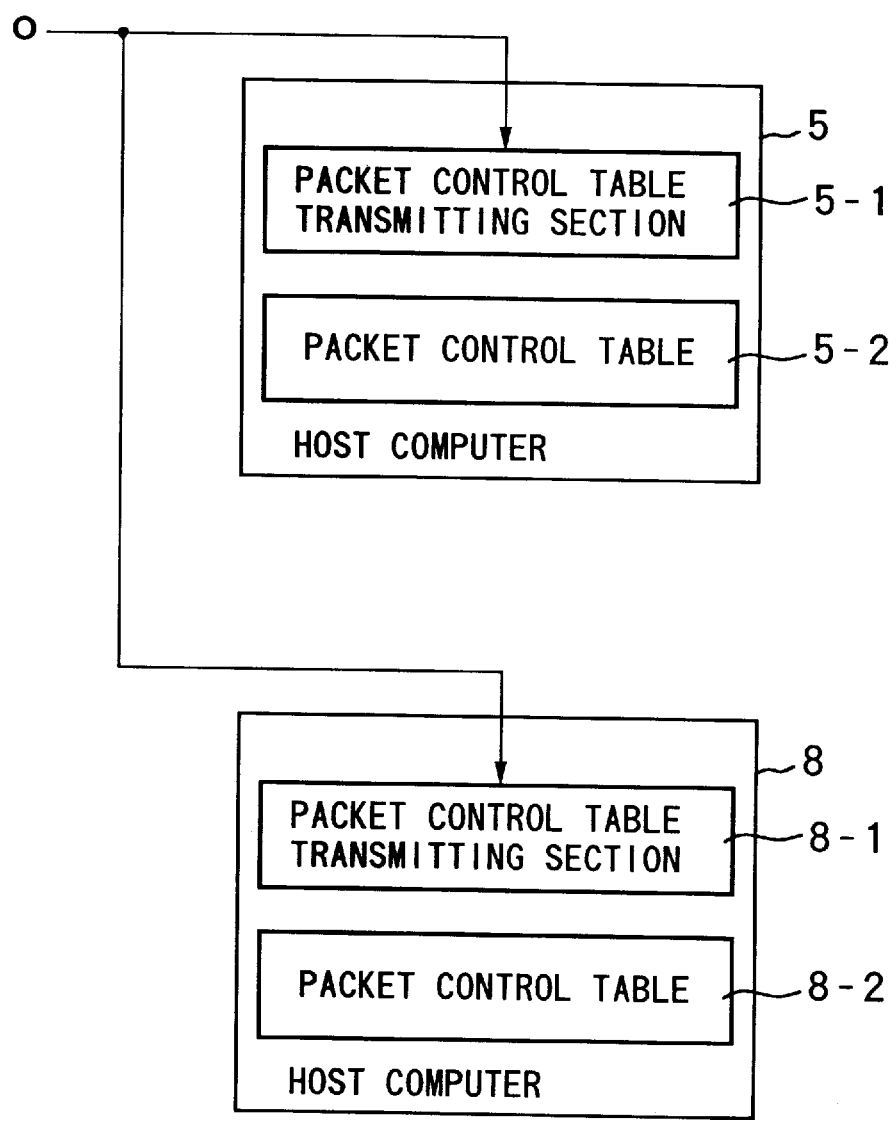

A third embodiment of the invention is illustrated in FIG. 9. The packet control table 4 comprises a packet control table 4-1 and a packet control table 4-2. With the exception of the fact that a host computer 8 has been added, this arrangement is no different from that of FIG. 6.

In FIG. 9, the packet control table 4-1 is the result of downloading and storing the packet control table 5-2 of host computer 5 in the memory by the connection communicating section 2-2, and the packet control table 4-2 similarly is the result of downloading a packet control table 8-2 of the host computer 8.

The operation of the MML control program 2b in FIG. 9 is the same as the MML control flow in FIG. 6 and therefore is deleted. In FIG. 9, operation at request for connection to the host computer 5 from the user program at a certain time can be described by interchanging the host computer 5 and packet control table 4 in FIG. 6 with the host computer 5 and packet control table 4-1, respectively, of FIG. 9. Further, in FIG. 9, operation at request for connection to the host computer 8 from the user program at another time can be described by interchanging the host computer 5 and packet control table 4 in FIG. 6 with the host computer 5 and packet control table 4-2, respectively, of FIG. 9.

By virtue of the foregoing embodiment, a plurality of host computers can be communicated with simultaneously using an MML function, and versatility is enhanced in comparison with the second embodiment. In the second embodiment, a request for connection to a host computer is not made dynamically in the program. Instead, packet control tables for the host computer 5 and host computer 8 are awaited at all times. For example, when the user program attempts to communicate simultaneously with the host computers 5 and 8, two packet control tables for these host computers must stay permanently in memory and restarting must be performed in the microcomputer together with the MML control program for every user program.

<Fourth Embodiment>

Figure 10:
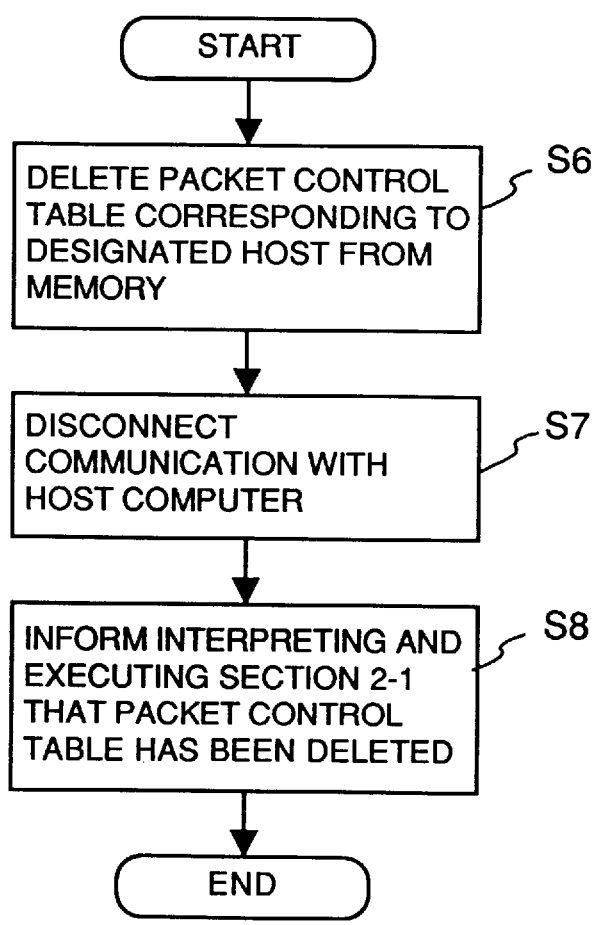
FIG. 10 is a diagram showing the processing of a disconnect routine for disconnecting a communication connecting portion according a fourth embodiment of the present invention.

A fourth embodiment of the invention will be illustrated with reference to FIG. 9. This embodiment illustrates an example in which the packet control tables 4-1 and 4-2 do not reside in the memory of the microcomputer 7 simultaneously. This can be realized by providing the connection communicating portion 2-2 in FIG. 9 with a disconnect function. The program is illustrated in FIG. 10.

The user program section 3-2 calls a subroutine in the MML interface library section 3-1 in order to request disconnect. This subroutine calls a disconnect subroutine of the connection communicating section 2-2 using an interrupt or the like. In FIG. 10, a packet control table corresponding to the host computer to be disconnected is deleted from memory at step S6 and communication with the host computer is cut off at step S7. Then, at step S8, the interpreting and executing section 2-1 is informed of the fact that this packet control table can no longer be used.

Figure 11:
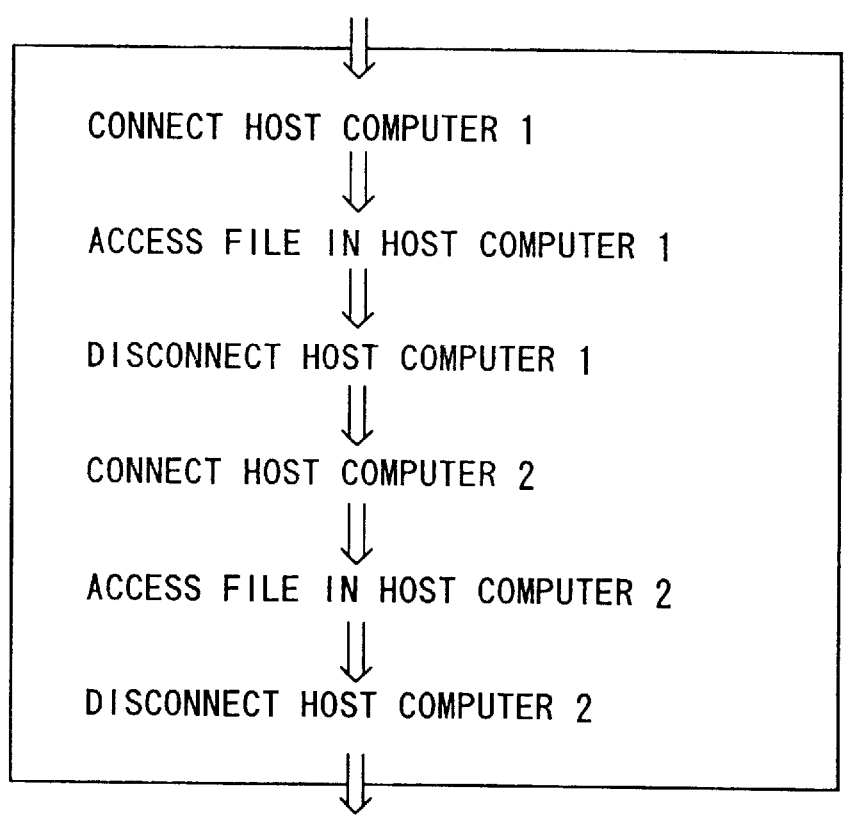
FIG. 11 is a diagram showing the function of a user program according to the fourth embodiment.
Figure 12:
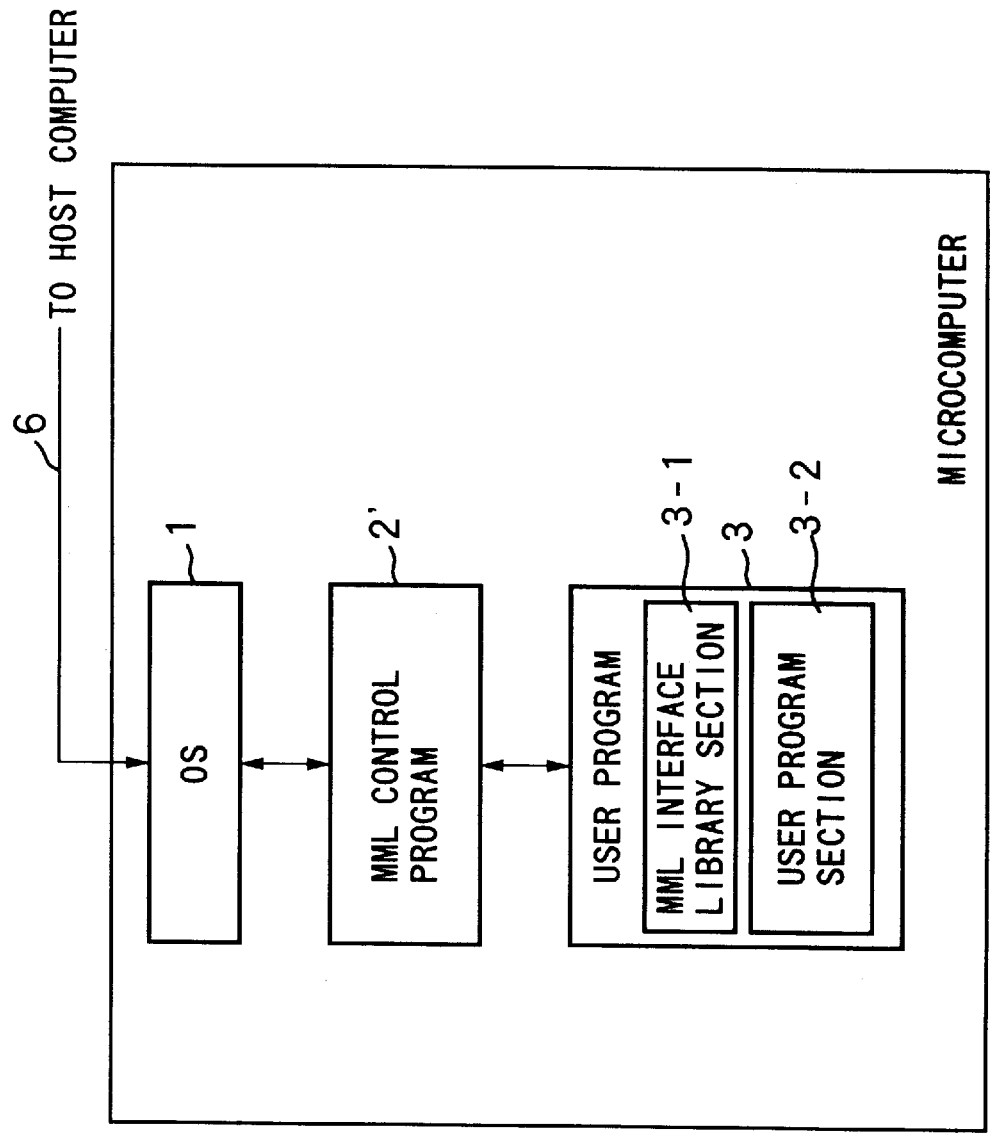
FIG. 12 is a diagram showing an MML control method according to the prior art.
Figure 15B:
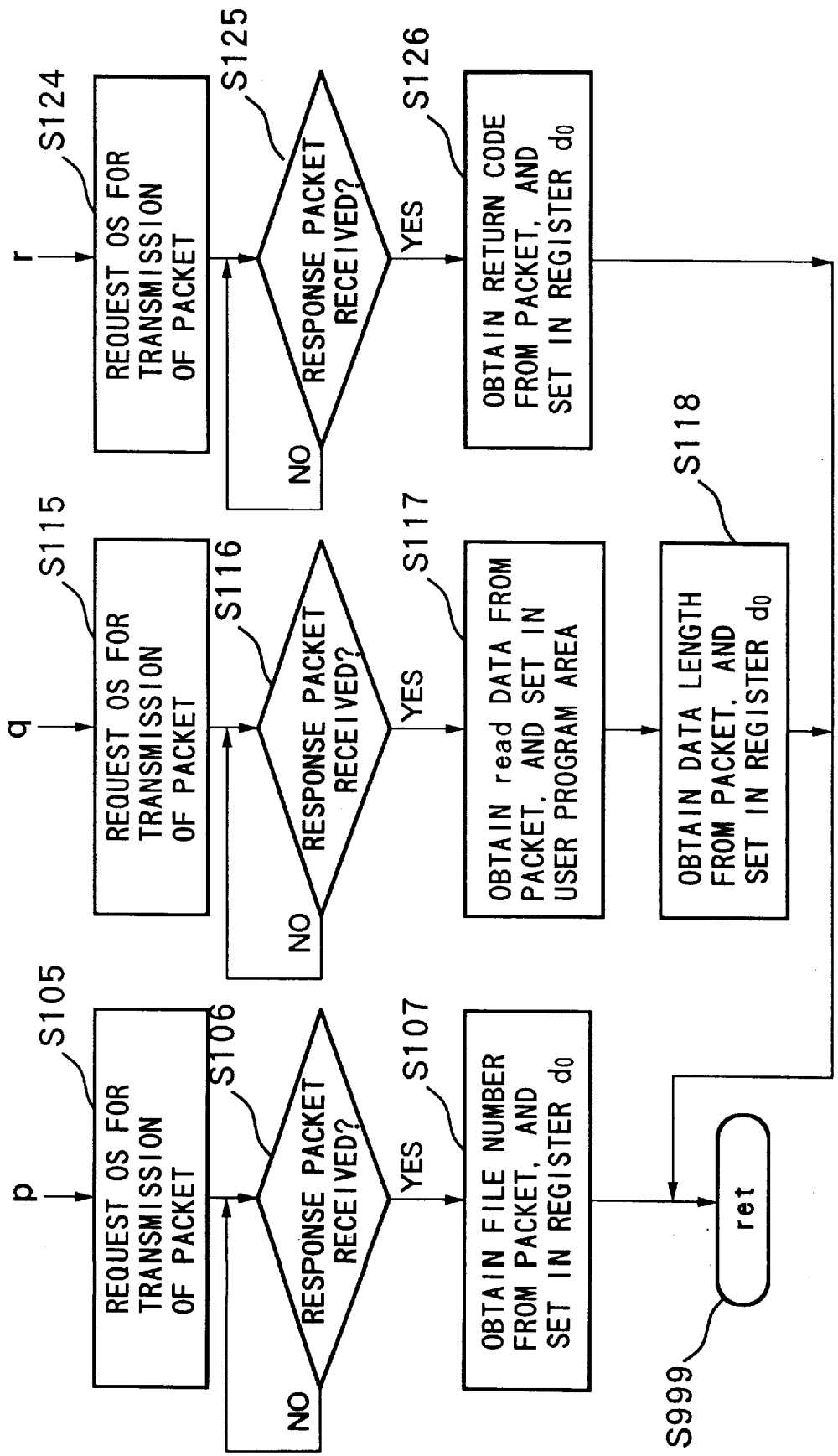

In a case where the user program 3 performs the series of operations shown in FIG. 11, it will suffice if only one packet control table resides in the microcomputer 7 at any one time. Thus, the user program does not communicate simultaneously with a plurality of host computers by means of the MML function. However, in a case where one user program accesses files in a plurality of host computers, it is unnecessary to possess packet control tables for all host computers, as is required in the prior art. This makes it possible to utilize the memory effectively.

By virtue of the second through fourth embodiments described above, a micro-mainframe link control method and apparatus can be provided in which the files in a plurality of hosts can readily be accessed without causing a decline in the efficiency of memory utilization.

More specifically, a program which uses an MML function is capable of designating any host in terms of a program. An MML application capable of communicating simultaneously with a plurality of host computers can be created, and memory can be conserved since only packet control tables for host computers communicating simultaneously need be stored in memory.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a micro device making an access to a file present in a mainframe by a micro device linked to the mainframe, said method comprising the steps of:

in response to a request for file access from a user program executed in the micro device, referring to a table in which a plurality of command sequences are stored corresponding to a plurality of kinds of requests respectively, and reading out one of the command sequences corresponding to a kind of the request from the user program, each of the plurality of command sequences including a process for composing and transmitting a transmission packet, each command included in a command sequence to compose one of the transmission packets being executed to obtain components of the transmission packet;

composing a transmission packet, said composing step including a step of interpreting, by a control program executed in the micro device, the command sequence read out from the table corresponding to the kind of request from the user program; and transmitting the composed transmission packet to the mainframe in accordance with a command in the command sequence.

2. A method of controlling a micro device to access to a file present in a mainframe linked to the micro device, said method comprising the steps of:

In response to a request for file access from a user program executed in the micro device, referring to a table in which a plurality of command sequences are stored corresponding to a plurality of kinds of requests respectively, and reading out one of the command sequences corresponding to a kind of the request from the user program, each of the plurality of command sequences including a process for composing and transmitting a transmission packet, each command included in a command sequence to compose one of the transmission packets being executed to obtain components of the transmission packet, wherein at least one command in a command sequence to compose a transmission packet is a set command including variables specifying position and length by which a component of the transmission packet is read out;

composing a transmission packet, said composing step comprising a step of interpreting, by a control program executed in the micro device, the command sequence read out from the table corresponding to the kind of request from the user program, and a step of reading out data of the length from the position specified by the variables and setting the data as a component according to the set command; and transmitting the composed transmission packet to the mainframe in accordance with a command in the command sequence.

3. A method of controlling a micro device according to claim 2, each of the command sequences in the table further including a command to be executed to extract data from a reception packet, and said method further comprising the steps of receiving a reception packet from the mainframe corresponding to the transmission packet and extracting data from the reception packet in accordance with the command sequence corresponding to the request from the user program.

4. A method of controlling a micro device according to claim 3, wherein said command to be executed to extract data from a reception packet includes information specifying length by which data is extracted from the reception packet, and said extracting step includes extracting data of the length from the reception packet.

5. A method of controlling a micro device to access has a file present in a mainframe linked to the micro device, said method comprising the steps of:

transferring a table to the micro device from the mainframe, said table including a plurality of command sequences for use in composing and transmitting transmission packets corresponding respectively to a plurality of kinds of requests, each of a plurality of commands included in a command sequence to compose a transmission packet being executed to obtain respective components of the transmission packet, wherein at least one command in a command sequence to compose a transmission packet is a set command including variables specifying position and length by which a component of the transmission packet is read out;

in response to a request for file access from a user program executed in the micro device, referring to the table transferred in said transferring step;

composing a transmission packet, said composing step including interpreting, by a control program executed in the micro device, the command sequence read out from the table corresponding to the kind of request from the user program, and a step of reading out data of the length from the position specified by the variables and setting the data as a component according to the set command; and transmitting the composed transmission packet to the mainframe in accordance with a command in the command sequence.

6. A method of controlling a micro device according to claim 5, each command sequence in the table further including a command to be executed to extract data from a reception packet, said method further comprising the steps of:

receiving a reception packet from the mainframe corresponding to the transmission packet; and extracting data from the reception packet in accordance with the command sequence corresponding to the request from the user program.

7. A micro device to access a file present in a mainframe linked to the micro device, said device comprising:

storage means for storing a table in which a plurality of command sequences are stored corresponding respectively to a plurality of kinds of requests, each of the plurality of command sequences including a process for composing and transmitting a transmission packet, each of a plurality of commands included in a command sequence to compose a transmission packet being executed to obtain respective components of a transmission packet;

referring means for referring to the table in said storage means in response to a request of file access from a user program executed in the micro device;

composition means for composing a transmission packet, said composition means comprising means for interpreting, by a control program executed in the micro device, a command sequence read out from the table corresponding to a kind of request from the user program; and transmitting means for transmitting the transmission packet composed by said composition means to the mainframe in accordance with a command in the command sequence.

8. A micro device to access to a file present in a mainframe linked to the micro device, said device comprising:

storage means for storing a table in which a plurality of command sequences for use in composing and transmitting transmission packets are stored corresponding respectively to a plurality of kinds of requests, each of a plurality of commands included in a command sequence to compose a transmission packet being executed to obtain respective components of a transmission packet, wherein at least one command in a command sequence to compose a transmission packet is a set command including variables specifying position and length by which a component of the transmission packet is read out;

referring means for referring to the table in said storage means in response to a request of file access from a user program executed in the micro device;

composition means for composing a transmission packet, said composition means comprising means for interpreting, by a control program executed in the micro device, the command sequence read out from the table corresponding to the kind of request from the user program, and means for reading out data of the length from the position specified by the variables and setting the data as a component according to the set command; and transmitting means for transmitting the transmission packet composed by said composition means to the mainframe in accordance with a command in the command sequence.

9. A micro device according to claim 8, each command sequence in the table stored in said storage means further including a command to be executed to extract data from a reception packet, said device further comprising:

receiving means for receiving a reception packet from the mainframe corresponding to the transmission packet transmitted by said transmission means; and extracting means for extracting data from the reception packet received by said receiving means in accordance with the command sequence corresponding to the request from the user program.

10. A micro device according to claim 9, wherein the command to be executed to extract data from a reception packet includes information specifying length by which data is extracted from the reception packet, and said extracting means comprises means of extracting data of the length from the reception packet.

11. A micro device according to claim 7, wherein said storage means stores a plurality of the tables each of which corresponds to a plurality of mainframes respectively.

12. A micro device to access a file present in a mainframe linked to the micro device, said device comprising:

storage means for storing information;

transferring means for transferring a table to said storage means from the mainframe, said table including a plurality of command sequences for use in composing and transmitting transmission packets corresponding respectively to a plurality of kinds of requests, each of a plurality of commands included in a command sequence to compose a transmission packet being executed to obtain respective components of the transmission packet, wherein at least one command in a command sequence to compose a transmission packet is a set command including variables specifying position and length by which a component of the transmission packet is read out;

referring means for referring to the table in said storage means in response to a request of file access from a user program;

composition means for composing a transmission packet, said composition means including means for interpreting, by a control program executed in the micro device, the command sequence read out from the table corresponding to the kind of request from the user program, and means for reading out data of the length from the position specified by the variables and setting the data as a component according to the set command; and transmission means for transmitting the transmission packet composed by said composition means to the mainframe in accordance with a command in the command sequence.

13. A micro device according to claim 12, each command sequence in the table stored in said storage means further including a command to be executed to extract data from a reception packet, and said device further comprising:

receiving means for receiving a reception packet from the mainframe corresponding to the transmission packet transmitted by said transmission means; and extracting means for extracting data from the reception packet received by said receiving means in accordance with the command sequence corresponding to the request from the user program.

* * * * *